July 29, 1930.  E. AVILA  1,771,389

UNIVERSAL GAUGE FOR PINIONS AND ESCAPE WHEELS

Filed March 28, 1928  2 Sheets-Sheet 1

Inventor
Enrique Avila
By B. Singer, Atty.

July 29, 1930.  E. AVILA  1,771,389
UNIVERSAL GAUGE FOR PINIONS AND ESCAPE WHEELS
Filed March 28, 1928   2 Sheets-Sheet 2
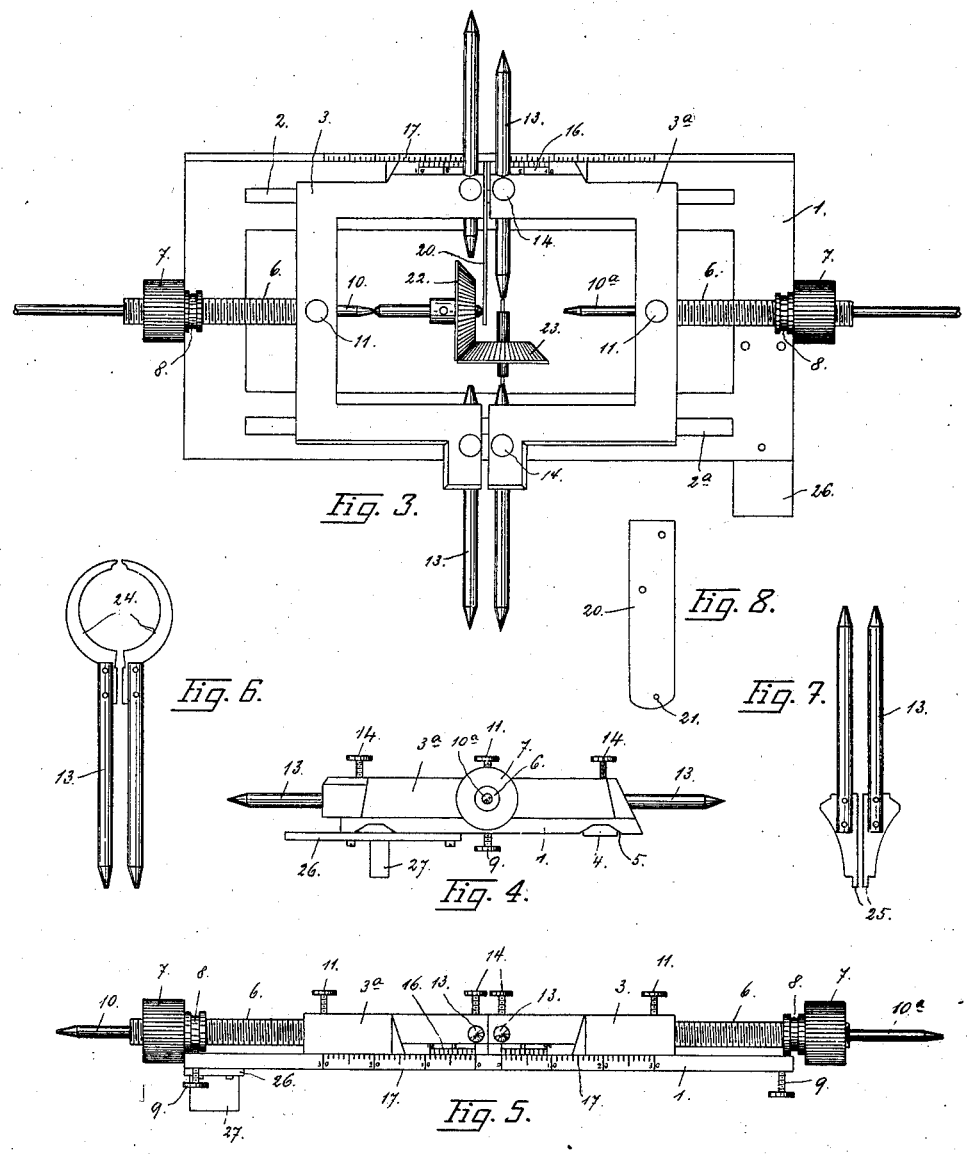

Patented July 29, 1930

1,771,389

UNITED STATES PATENT OFFICE

ENRIQUE AVILA, OF TOLUCA, MEXICO

UNIVERSAL GAUGE FOR PINIONS AND ESCAPE WHEELS

Application filed March 28, 1928, Serial No. 265,380, and in Mexico November 8, 1927.

The present invention refers to a gauge especially adapted to be used by watch and clock makers and repairers, by means of which gauge a great variety of different operations may be carried out without having to change from one measuring tool to another, thereby effecting a big saving in time and labor. The invention has for its object to provide a universal gauge by means of which all kinds of pinions, escape wheels, balance wheels and other parts of watches and clocks may be centered, gauged, measured, trued and levelled, and which at the same time permits the measuring of thicknesses and heights.

In the accompanying drawings:

Fig. 3 is another top plan view of the gauge with attachment for inserting bevel wheels.

Fig. 4 is a side elevation of the gauge.

Fig. 5 is a front elevation of the gauge.

Figs. 6 and 7 show respectively outside and inside calipers to be used with the gauge.

Fig. 8 is a front view of the plate for holding bevel wheels.

Figure 1:
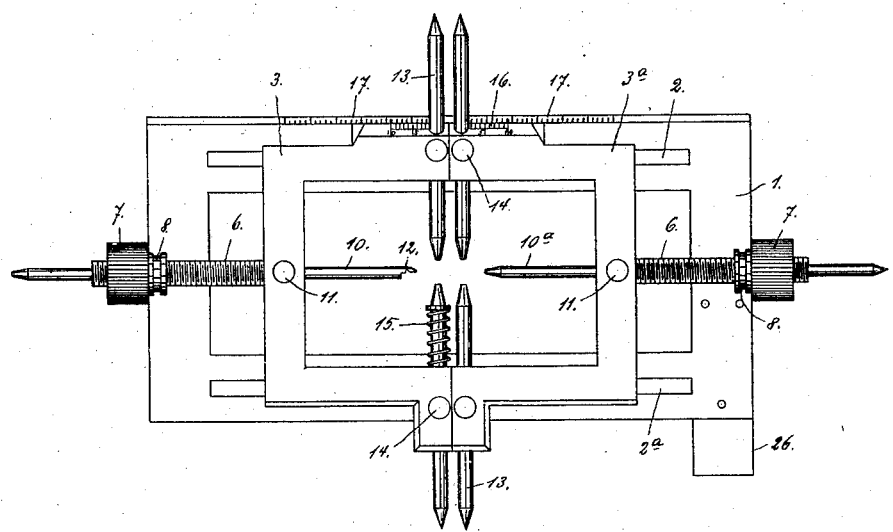
Fig. 1 is a top plan view of the gauge.

Referring to the drawings in detail, in which similar reference characters correspond to similar parts throughout the several views, the numeral 1 indicates a rectangular metal plate having a rectangular opening in its center and two slots 2 and $2^a$ parallel with each of its longer sides. On top of this plate two U-shaped members 3 and $3^a$ are slidably mounted opposite each other by means of two blocks 4 for each slide, running in prismatic guides 5 provided on the under side of slots 2 and $2^a$. Both slides 3 and $3^a$ when united at the center of the apparatus form a rectangular frame.

Figure 2:
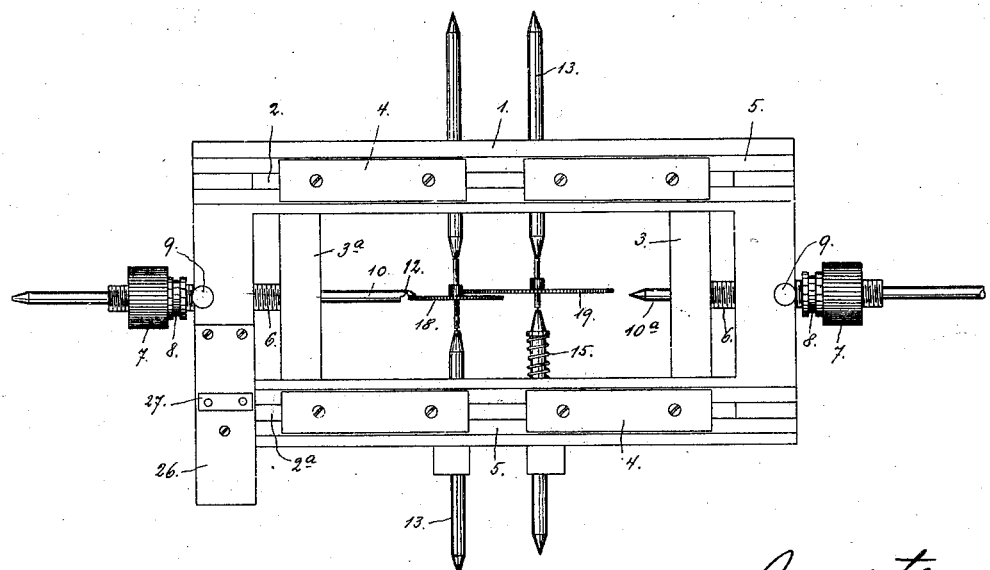
Fig. 2 represents the gauge viewed from below.

The slides 3 and $3^a$ are perforated at their centers and in each perforation is rigidly fixed the end of a micrometer screw 6, extending horizontally towards the outside of said slides. Each micrometer screw 6 is provided with a knurled nut 7 having a shoulder with an annular groove 8, by means of which the nut 7 may be detained in a fixed position on plate 1 by means of a set screw 9 the point of which enters from below through plate 1 into said groove 8. In this fixed position of the nut 7, shown in Figures 1 and 3 and left side of Figure 5, the screw 6 may be longitudinally displaced for fine measurements by rotating the nut 7 carrying with it the slide attached to it, while the slides may also be moved by hand upon releasing the set screw 9 from engagement with the groove 8, as shown in Figure 2 and right side of Figure 5.

Both micrometer screws 6 are perforated along their center for receiving a sliding pin 10 and $10^a$, which may be fixed in any position by set screws 11 passing from above through the center of each slide 3 and $3^a$ and through the inserted end portions of screws 6. One of these sliding pins (10) has at one end a finger-shaped projection 12 with a flat base, while the other end forms a hollow point for inserting a wheel axle. The other pin ($10^a$) also has a hollow point at one end and a sharp point at its other end.

The adjacent inner ends of slides 3 and $3^a$ are perforated transversely for receiving four round sliding pins 13 having also both hollow and pointed ends, the two pins corresponding to each slide being located exactly in the same line. The pins 13 may be fixed in any position by set screws 14, and one of said pins is preferably provided with a collar against which bears a spiral spring 15 which on being compressed facilitates the insertion of a pinion axle between said resiliently mounted pin and the opposite sliding pin.

The extremities on one side of slides 3 and $3^a$ are bevelled and provided with a vernier 16 sliding along a graduated scale 17 cut into the bevelled edge of plate 1. Each scale as also the corresponding verniers, starts at a point exactly below the center line of the pins 13, so that when the two slides 3 and $3^a$ have been brought together in the center of the gauge, the zeros of the verniers correspond with the zeros on the scales 17.

Figure 2 shows the gauge applied to measuring the distance between the axles of two pinions 18 and 19, the second of which engages a center pinion of the first. The axles of both pinions are held between the hollow points of opposite pins 13 after the two slides 3 and $3^a$ have been separated by hand or by means of the micrometer screws 6 as explained before. The distance between the two axles is read on scales 17, and may also be easily transferred to a metal plate by marking it with the pointed outer ends of pins 13. The finger 12 of pin 10 is seen placed on the periphery of pinion 18 for ascertaining its true level, which is readily obtained by rotating the pinion. For equalizing the teeth of a pinion of escape wheel, the edge of the wheel to be tested is brought to bear lightly against the shank of a pin 13 of the opposite slide, while being held between the pins of one slide, and on rotating the wheel with the finger, any slight obstruction due to a longer tooth will readily be noticed and can easily be remedied. Many other applications will appear to those skilled in the art and need not be gone into any further.

Figure 3 shows the gauge provided with an additional plate 20 screwed to one of the abutting ends of either slide 3 or 3ª and having a small hole 21 at a point exactly in a line with the points of pins 10 and 10ª. This plate serves as shown in said figure, for detaining between it and either one of the pins 10 or 10ª a bevel wheel 22 engaged with another bevel wheel 23 held between the two pins 13 of the opposite slide.

Instead of the ordinary two-pointed pins 13, other pins carrying outside calipers 24 or inside calipers 25 may be inserted into the slides 3 and 3ª, the thicknesses measured being read on scales 17 as before.

For clamping the gauge to the work bench, two projections 26 and 27 placed at right angles to each other are provided below the base plate 1 and permit the gauge to be fixed either in a vertical or in a horizontal position, leaving both hands free.

Obviously, the gauge described may be made in different sizes according to the sizes of wheels most commonly used in a special kind of work. Also various changes may be made in the details of construction of the gauge without departing from the spirit of the invention.

What I claim is:—

1. A gauge for pinions and escape wheels, comprising a metal base plate having a central opening therethrough, two U-shaped members slidably mounted thereon, and arranged in reverse relation with respect to each other with the extremities of the arms of one member adjacent the extremities of the arms of the other member, respectively, screws for displacing each of said sliding members relative to the other member and to said base plate, a pin passing through each of said sliding members in the direction of its movement, sliding pins passing transversely through the adjacent extremities of the arms of said sliding members and at right angles to the first named pins, all of said pins being provided with means for detaining them in a fixed position, a vernier provided on each sliding member, and graduated scales provided on the base plate and extending in opposite directions from lines coinciding with the centers of said transversely arranged sliding pins when the sliding members are in their central position longitudinally of the frame.

2. A gauge for pinions and escape wheels, comprising a flat metal base plate having a rectangular central opening therethrough, two U-shaped members slidably mounted thereon, each sliding member forming the half of a rectangular frame, a micrometer screw attached at one end to the center of each of said sliding members, and having a longitudinal bore, nuts provided on said micrometer screws and each having a shoulder with an annular groove, a set screw passing through the base plate for entering said annular groove, movable pins passing longitudinally through the bore of each of said micrometer screws, means for detaining said longitudinal pins in a fixed position, in said micrometer screws, sliding pins arranged transversely of the sliding members and passing through the extremities thereof, each of said pins being provided at one end with a hollow and at the other end with a sharp point, a spiral spring for pushing one of the said last named sliding pins toward the other pin carried by the same sliding member, set screws for detaining said last named pins in fixed position with respect to the sliding members by which they are carried, a vernier provided on one side of each U-shaped sliding member, and two graduated scales provided along the edge of the base plate below said verniers and extending in opposite directions from lines coincident with the centers of said last named pins, when the sliding members are in mutual contact in mid-position on the base plate.

3. A gauge for pinions and escape wheels, comprising a base plate having a central opening therethrough, two U-shaped members slidably mounted thereon, and arranged in reverse relation with respect to each other, with the extremities of the arms of one member opposed to the extremities of the arms of the other member, respectively, micrometer screws for moving said sliding members toward and from each other and having longitudinal bores, sliding pins in the bores of the micrometer screws, pins at right angles to the first named pins and passing transversely through the arms of the said sliding members, means for detaining said sliding pins in fixed positions, a plate attached to one extremity of one of said sliding members and having a hole in line with the points of the first named sliding pins, means for indicating the distance between adjacent transversely arranged sliding pins, and means to facilitate the clamping of the gauge to a work bench.

4. A gauge for pinions and escape wheels, comprising a rectangular base plate having a rectangular central opening therethrough, two U-shaped sliding members mounted thereon and arranged in reverse relation with respect to each other, with the extremities of the arms of one member opposed to the extremities of the arm of the other member, respectively, micrometer screws attached at one end to said sliding members for making fine adjustments of the work and having longitudinal bores, longitudinally sliding pins passing through said bores of said micrometer screws, sliding pins arranged at right angles to the first named pins and passing through the arms of said sliding members, set screws for detaining each sliding pin in fixed position, a vernier provided on each sliding member and graduated scales provided on the base plate for determining the distance between adjacent transversely arranged sliding pins.

In testimony whereof I affix my signature.

ENRIQUE AVILA.